US011975656B2

(12) United States Patent
Huang (10) Patent No.: US 11,975,656 B2
(45) Date of Patent: May 7, 2024

(54) TRAY STABILIZER SYSTEM FOR FOOD DELIVERY ROBOTS

(71) Applicant: Zhenwu Huang, Las Vegas, NV (US)

(72) Inventor: Zhenwu Huang, Las Vegas, NV (US)

( * ) Notice: Subject to any disclaimer, the term of this patent is extended or adjusted under 35 U.S.C. 154(b) by 115 days.

(21) Appl. No.: 17/549,815

(22) Filed: Dec. 13, 2021

(65) Prior Publication Data

US 2023/0182650 A1 Jun. 15, 2023

(51) Int. Cl.
| | | |
|---|---|---|
| *B60R 11/00* | (2006.01) | |
| *B25J 5/00* | (2006.01) | |
| *B25J 15/06* | (2006.01) | |

(52) U.S. Cl.
CPC .............. *B60R 11/00* (2013.01); *B25J 5/007* (2013.01); *B25J 15/0658* (2013.01); *B60R 2011/0056* (2013.01); *B60R 2011/008* (2013.01)

(58) Field of Classification Search
CPC ............. B60R 11/00; B60R 2011/0056; B60R 2011/008; B25J 5/007; B25J 15/0658; B25J 19/0091
USPC ........... 267/136, 137; 248/205.5, 205.9, 363, 248/636
See application file for complete search history.

(56) References Cited

FOREIGN PATENT DOCUMENTS

| CN | 109129514 A | * | 1/2019 | ............ A47G 23/08 |
|---|---|---|---|---|
| CN | 109798325 A | * | 5/2019 | |
| CN | 210577857 U | * | 5/2020 | |
| CN | 112224736 A | * | 1/2021 | |
| CN | 214296926 U | * | 9/2021 | |
| CN | 214803906 U | * | 11/2021 | |

* cited by examiner

*Primary Examiner* — Kimberly T Wood
(74) *Attorney, Agent, or Firm* — The Thornton Firm, LLC (57) ABSTRACT

A tray stabilizer system for delivery robots includes a base having an upper end and a lower end; a shock absorbing outer shell assembly, the shock absorbing outer shell assembly having an upper end and a lower end and configured to slidingly house in the space inside the base; a shock-absorbing inner shell assembly, the shock absorbing inner shell assembly having an upper end and a lower end and configured to slidingly house in the space inside the shock absorbing outer shell assembly; a suction cup assembly; and a shock absorbent pad. A method of using the tray stabilizer system for delivery robots includes the steps of preparing a surface onto which the tray stabilizer system is mounted; mounting the system to the prepared surface; placing a tray on the shock absorbing upper pad; and placing an item to be delivered onto the tray.

19 Claims, 4 Drawing Sheets

FIG. 4

TRAY STABILIZER SYSTEM FOR FOOD DELIVERY ROBOTS

CROSS-REFERENCE TO RELATED APPLICATIONS

Not applicable.

RELATED U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

The invention relates generally to the field of food delivery robots. More specifically, the present invention relates to a tray or tray stabilizer system for food delivery robots.

2. Description of the Related Art

Automation is sweeping across all industries. With the development of machine learning and artificial intelligence, intelligent robots have found their way into our everyday lives.

Food delivery robots are becoming increasingly popular in the hospitality industry. Today's food delivery robots employ complex sensing and vision technologies coupled with reliable algorithmic obstacle avoidance software and firmware. Such technologies ensure safe operation and can provide enjoyable and accurate service. Food delivery robots currently employ simplified and easy-to-use processes for restaurants and other service industries to successfully implement. Providers of food delivery robots offer complete data management and system management through a robot's positioning system which can be applied in restaurants, hotels, exhibition service venues, and so on. And where once the idea of a robot delivering food may have been unattractive to bar and restaurant patrons, the COVID-19 pandemic, and the need for contactless delivery, has set the stage for autonomous food delivery robots to be used not only in bars and restaurants, but in other settings as well.

One of the greatest challenges presented for today's food delivery robots involve bumps, impacts, and vibrations. Such hazards are virtually unavoidable for food delivery robots during the delivery process. Bumps, impacts and vibrations can adversely impact food delivery service by causing a food delivery robot to spill food and beverages. Such spillage often results in food plates being returned which ultimately results in monetary loss to the establishment.

Based on the foregoing, there is a need for an improved tray or tray stabilizer system for food delivery robots such as, but not limited to, food delivery robots.

SUMMARY

The object of the present invention is to provide an improved tray or tray stabilizer system for food delivery robots. Such a tray stabilizer system is capable of absorbing shocks, bumps and other impacts encountered by food delivery robots.

Embodiments of the invention include a base having an upper end and a lower end; a shock absorbing outer shell assembly, the shock absorbing outer shell assembly having an upper end and a lower end and configured to slidingly house in the space inside the base; a shock-absorbing inner shell assembly, the shock absorbing inner shell assembly having an upper end and a lower end and configured to slidingly house in the space inside the said shock absorbing outer shell assembly; a suction cup assembly; and a shock absorbent pad. The shock absorbent pad rests on the upper end of the shock-absorbing inner shell and can have a generally convex shape which can reduce the impact force by absorbing the direct action between the load and tray.

The tray stabilizer system for food delivery robots further includes a tension spring fixing seat extending from the suction cup which forms a suction cup assembly. A plurality of tension springs connects the tension spring fixing seat to the lower end of the base. This tension spring assembly allows the tray stabilizer system to move laterally or horizontally, thereby absorbing horizontal impact forces as well as other forces encountered by a delivery robot.

The tray stabilizer system for food delivery robots further includes a ball wheel assembly. The ball wheel assembly is mounted along the inner diameter of the lower end of the base having an upper end and a lower end. The ball wheel assembly allows the tray stabilizer system to move horizontally so as to absorb and mitigate any horizontal impact force.

The base of the tray stabilizer system for food delivery robots includes a fixing rod mounted in the center of the base having an upper end and a lower end wherein the fixing rod runs through the center of the shock absorbing outer shell assembly and the center of the shock absorbing inner shell assembly. A spring and a spring fixing seat are connected to the fixing rod at the upper end of the shock absorbing inner shell assembly. The tray shock absorbing inner shell assembly having an upper end and a lower end, includes a shock absorbing inner shell cover which includes a plurality of slide balls which contact the inner diameter of the shock absorbing outer shell and permit the shock absorbing inner shell assembly to travel inwards and outwards from the shock absorbing outer shell. The inner shell cover further serves as a mounting point for a return spring, the return spring being positioned between the inner shell cover and the base. The shock absorbing inner shell further includes a slider assembly including at least one downward breather pipe and at least one upward breather pipe. The slider assembly further includes an upward sealing ring and a downward sealing ring, the said upward sealing ring and the said downward sealing ring serving as a check valve system using the at least one downward breather pipe and the at least one upward breather pipe. The slider assembly allows the shock absorbing inner shell assembly to move vertically and absorb vertical impact forces.

The shock absorbing upper pad is made from an impact absorbent material, and is placed on the upper end of the shock absorbing inner shell in such a way so as to create a surface onto which objects are placed. The shock absorbing upper pad is grooved in such a manner that, when a downward force is applied to the said shock absorbent upper pad, the grooves will increase in surface area providing greater contact with any object placed on the said shock absorbent upper pad.

Embodiments of the present invention will substantially reduce the horizontal and vertical impact forces generated by vibrational forces, impact forces, and inertial forces encountered by a delivery robot when it supports a tray loaded with spillable items such as beverages and food dishes. One such embodiment of the invention is configured to absorb 300N of vertical force and is capable of moving up to 30 millimeters horizontally so as to absorb forces from bumps, shocks and impacts.

BRIEF DESCRIPTION OF THE DRAWINGS

The invention directed by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

When a single device or article is described herein, it will be readily apparent to persons having skill in the art that more than one device or article or/machine (whether or not they cooperate) may be used in place of a single device or article or machine. Similarly, where more than one device or article or machine is described herein (whether or not they cooperate), it will be readily apparent that a single device/article may be used in place of the more than one device or article. Likewise, the functionality and/or the features of a device or article or machine may be alternatively embodied by one or more other devices or articles or machines which are not explicitly described as having such functionality and/or features. Thus, other embodiments of the present invention need not include a specific device in and of itself.

A "suction cup" is a device typically made from a material such as, but not limited to, soft rubber that is impenetrable by air. The suction cup has a concave area under the nose or head of the cup which naturally traps air inside of it. When a suction cup is pressed against a flat surface, like a tray, and the air trapped inside of the concave area is pressed outwards, away from the circular flap of the cup. The resultant partial vacuum from the air being removed produces an attractive force between the suction cup and the flat surface.

As is well known to those skilled in the art, many careful considerations and compromises typically must be made when designing the optimal manufacture or commercial implementation of such a tray stabilizer system for food delivery robots. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

Systems will be described and provided with means and methods for providing and implementing a tray stabilizer system for food delivery robots. The exemplary tray stabilizer system for food delivery robots will now be described in detail with reference to embodiments thereof as illustrated in the accompanying drawings.

Figure 1:
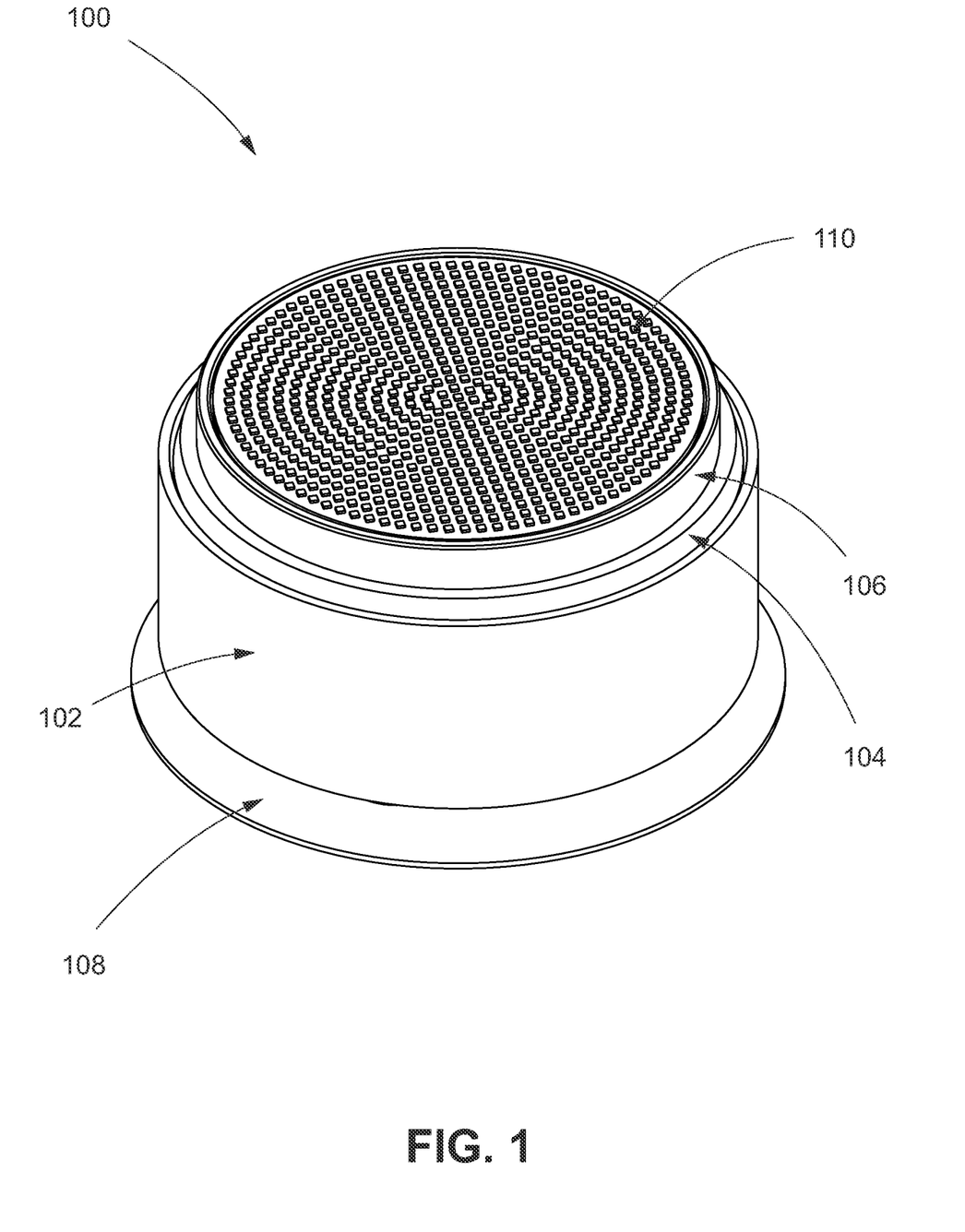
FIG. 1 illustrates an isometric view of a tray stabilizer system for food delivery robots in accordance with an embodiment of the invention.

FIG. 1 illustrates an isometric view of a tray stabilizer system for food delivery robots 100 in accordance with an embodiment of the invention. Embodiments of the invention include a base 102 having an upper end and a lower end; a shock absorbing outer shell assembly 104, the shock absorbing outer shell assembly having an upper end and a lower end and configured to slidingly house in the space inside the base 102; a shock-absorbing inner shell assembly 106, the shock absorbing inner shell assembly having an upper end and a lower end and configured to slidingly house in the space inside the said shock absorbing outer shell assembly 104; a suction cup assembly 108; and a shock absorbent pad 110. The shock absorbent pad 110 rests on the upper end of the shock-absorbing inner shell and can have a generally convex shape which can reduce the impact force by absorbing the direct action between the load and tray.

In an embodiment of the invention, the base 102, the shock-absorbing outer shell assembly 104, and the shock-absorbing inner shell assembly 106 are cylindrically shaped to form a single unit. In one embodiment the tray stabilizer system for food delivery robots is 150 millimeters in diameter and has a height of 20 millimeters. However, the dimensions of such a system can vary. In other embodiments, the aforementioned components can assume different shapes such as, but not limited to elliptical, conical, cuboid or rectangular. The suction cup assembly 108 and shock absorbent pad 110 can also assume different shapes and dimensions to conform with the general shape of the tray stabilizer system for food delivery robots 100.

In one embodiment of the invention, the base 102, the shock-absorbing outer shell 104, and the shock-absorbing inner shell 106 are made from an aluminum alloy. However, other suitable materials such as, but not limited to, plastics and other may be used to construct the aforementioned components.

In embodiments of the invention, shock absorbent upper pad 110 is made from a pliable, impact absorbent material such as, but not limited to, sponge, rubber, foam or other suitable material. The shock absorbent pad can be shaped by molding or other processes known and appreciated in the art. In one embodiment of the invention, the surface of the shock absorbent upper pad 110 is grooved in such a manner that, when a downward force is applied to the shock absorbent upper pad 110, the grooves will increase in surface area providing greater contact with any object placed on the said pad. Moreover, the grooves can absorb forces applied to the shock absorbent pad 110. In various embodiments of the invention, the thickness of the shock absorbent pad can vary.

In one embodiment of the invention, the suction cup 108 is made from a rubber or elastomeric material that, when pressed against a surface, is capable of being molded and creating a partial vacuum in the space between the said suction cup and the surface. Such a partial vacuum creates an attachment force. In alternative embodiments of the invention, the diameter of the suction cup 108 can vary. Mounting the system 100 to a food delivery robot involves applying downward force to the system 100. The suction cup will keep the system 100 affixed to any flat surface. A tray or pallet placed on the shock absorbent pad will be held in place by the frictional forces between the shock absorbent pad and the tray or pallet. Objects such as food and beverages placed on the tray or pallet will be less likely to spill or be tipped over due to the shock absorbing capabilities of the tray stabilizer system for food delivery robots.

Figure 2:
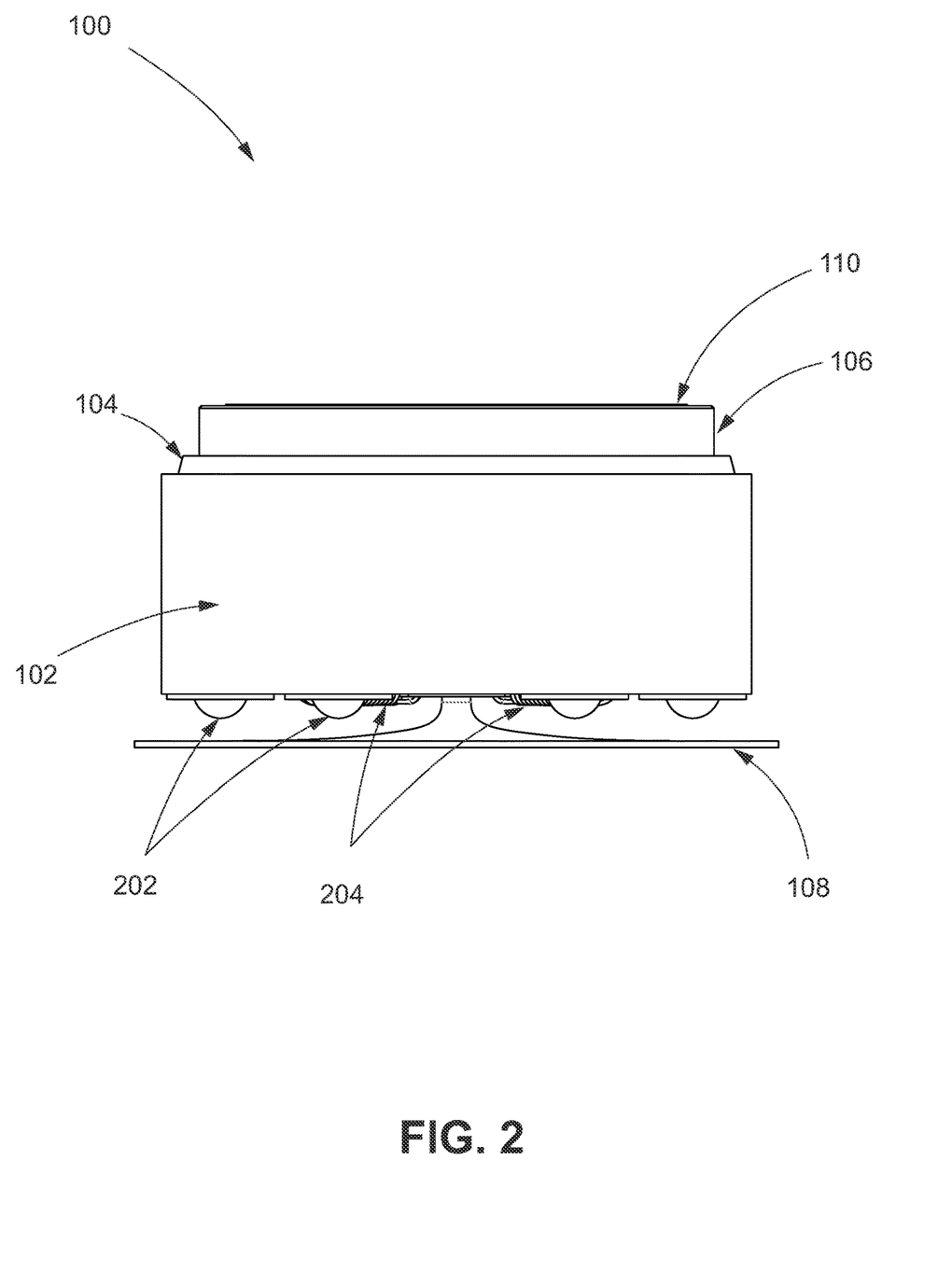
FIG. 2 illustrates a side elevation view of a tray stabilizer system for food delivery robots in accordance with an embodiment of the invention.

FIG. 2 illustrates a side elevation view of a tray stabilizer system 100 for food delivery robots in accordance with an embodiment of the invention. In an embodiment of the invention, the invention includes a base 102, a shock-absorbing outer shell 104, a shock-absorbing inner shell 106, a suction cup 108, and a shock absorbent pad 110. The invention further includes a ball wheel assembly 202 installed along the inner diameter of the lower end of the base 102. The ball wheel assembly includes a plurality of ball wheels in a circular pattern. Persons having skill in the art will appreciate that numerous types of ball wheels can be used so as to create an optimal ball wheel assembly 202. The ball wheels can be included into a circular-shaped frame so as to create a ball wheel frame or the ball wheels can be mounted individually on the inner diameter of the base 102. In one embodiment of the invention, the ball wheel assembly includes five ball wheels equally spaced apart. The ball wheel assembly 202 allows the tray stabilizer system to move laterally or horizontally so as to absorb and mitigate any horizontal impact force. Moreover, the ball wheel assembly can serve to affix and hold the suction cup assembly in place.

Figure 3:
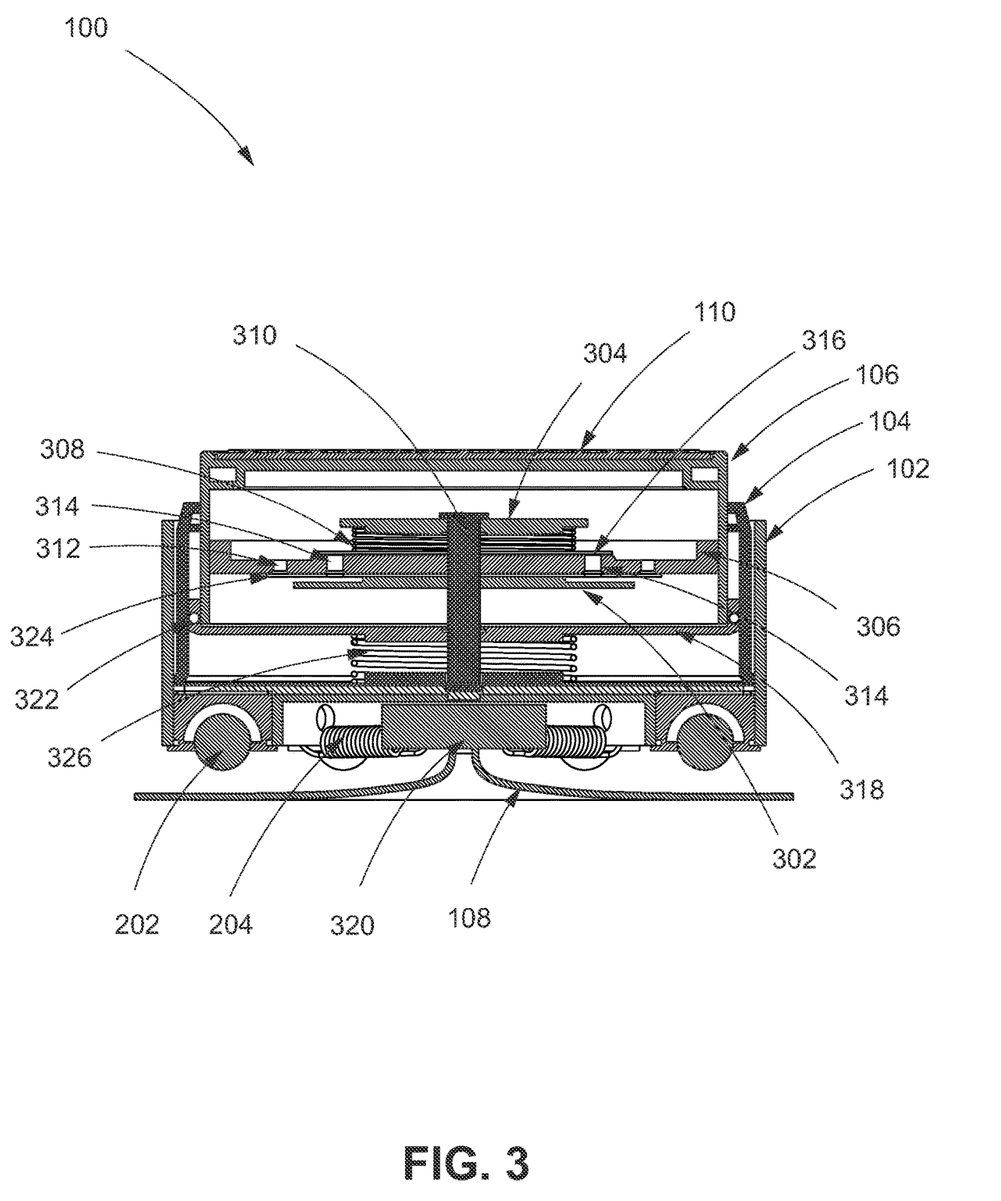
FIG. 3 illustrates a cross sectional diagram of a tray stabilizer system for food delivery robots in accordance with an embodiment of the invention.

FIG. 3 illustrates a cross sectional diagram of a tray stabilizer system for food delivery robots in accordance with an embodiment of the invention. Embodiments of the invention include a base 102, a shock-absorbing outer shell 104, a shock-absorbing inner shell 106, a shock absorbent pad 108, and a suction cup 110. Persons having skill in the art will recognize that the aforementioned components form assemblies when combined with other components.

In embodiments of the invention, the tray stabilizer system for food delivery robots includes a fixing rod 310 mounted in the center of the base 102 wherein the shock-absorbing outer shell assembly 104, the shock-absorbing inner shell assembly 106, and the base having an upper end and a lower end are connected by the fixing rod 310. The fixing rod 310 runs from the center of the base 102 through the center of the shock-absorbing outer shell assembly 104, through the center of the shock absorbing inner shell cover 318, and through the center of the shock-absorbing inner shell assembly 106. A spring 308 is held in place by a spring fixing seat 304. When a vertical downward force is applied to the upper end of the tray stabilizer system for food delivery robots 100, the shock absorbing inner shell assembly 106 is driven inward towards the lower end of the base 102. When driven inward, the spring 308 is extended. The spring 308 is ultimately compressed by a return spring 326.

The shock absorbing inner shell assembly 106 further includes a shock absorbing inner shell cover 318 which includes a plurality of slide balls 322 which contact the inner diameter of the shock-absorbing outer shell 104. The slide balls enable easier movement of the shock absorbing inner shell assembly 106. The shock-absorbing inner shell 106 seals the part with the slider 306 in the shock-absorbing outer shell 104 and is configured to slide up and down. The shock-absorbing inner shell 106 slides downwards under load and is configured to absorb shock from any weight or other external force directed downward or near downward.

The shock absorbing inner shell assembly 106 further includes a slider assembly which includes a lower fixing seat 302, a spring fixing seat 304, a slider 306, a spring 308, a fixing rod 310, one or more downward breather pipes 312, one or more upward breather pipes 314, a downward sealing ring 316; an inner shell cover 318; a plurality of ball wheels 202; a tension spring fixing seat 320; a plurality of tension springs 204; a plurality of slide balls 322; an upward sealing ring 324; and a return spring 326. The upward sealing ring 324 and the downward sealing ring 316 serve as a check valve system allowing the shock absorbing inner shell assembly to move vertically while providing a pressure buffer which allows for greater withstanding and absorbing of vertical impact forces.

When the shock-absorbing inner shell 106 is under load or receives a vertical impact, it slides downwards and inwards to the lower end of the base 102. When the shock-absorbing inner shell slides downwards or inwards, the upward sealing ring 324 is opened and the downward sealing ring 316 is closed. The upward sealing ring and the said downward sealing ring serving as a check valve system allowing the shock absorbing inner shell assembly to move vertically while withstanding and absorbing vertical impact forces. The closed upper end of the air pressure is connected to the closed area of the lower end through the downward breather pipe 312. Air pressure within the system is dispersed through the system as the upward sealing ring 324 and the downward sealing ring 316 are opened and closed. When the shock-absorbing inner shell 106 slides to a certain distance, under the action of the return spring 326, the upward sealing ring 324 is closed and the downward sealing ring 316 is opened, and the air pressure at the closed lower end is connected to the negative pressure zone at the upper end through the upward breather pipe's 314 connection. A vertical impact force is absorbed by the sliding up and down of the shock-absorbing inner shell 106. Moreover, the shock absorbing inner shell can mitigate any vibration caused by such an impact.

The tray stabilizer system for food delivery robots further includes a suction cup assembly which includes a tension spring fixing seat 320 above the suction cup 108. Such a suction cup assembly can be one single unit or can be a suction cup attached to a fixing seat. A plurality of tension springs 204 connects the tension spring fixing seat 320 to the lower end of the base. Persons skilled in the art will readily appreciate that numerous means and techniques can be used to attach tension springs from the base to a tension spring fixing seat such as, but not limited to, hooks. This tension spring assembly allows the tray stabilizer system to move laterally or horizontally, thereby absorbing horizontal impact forces as well as other forces encountered by a delivery robot.

Figure 4:
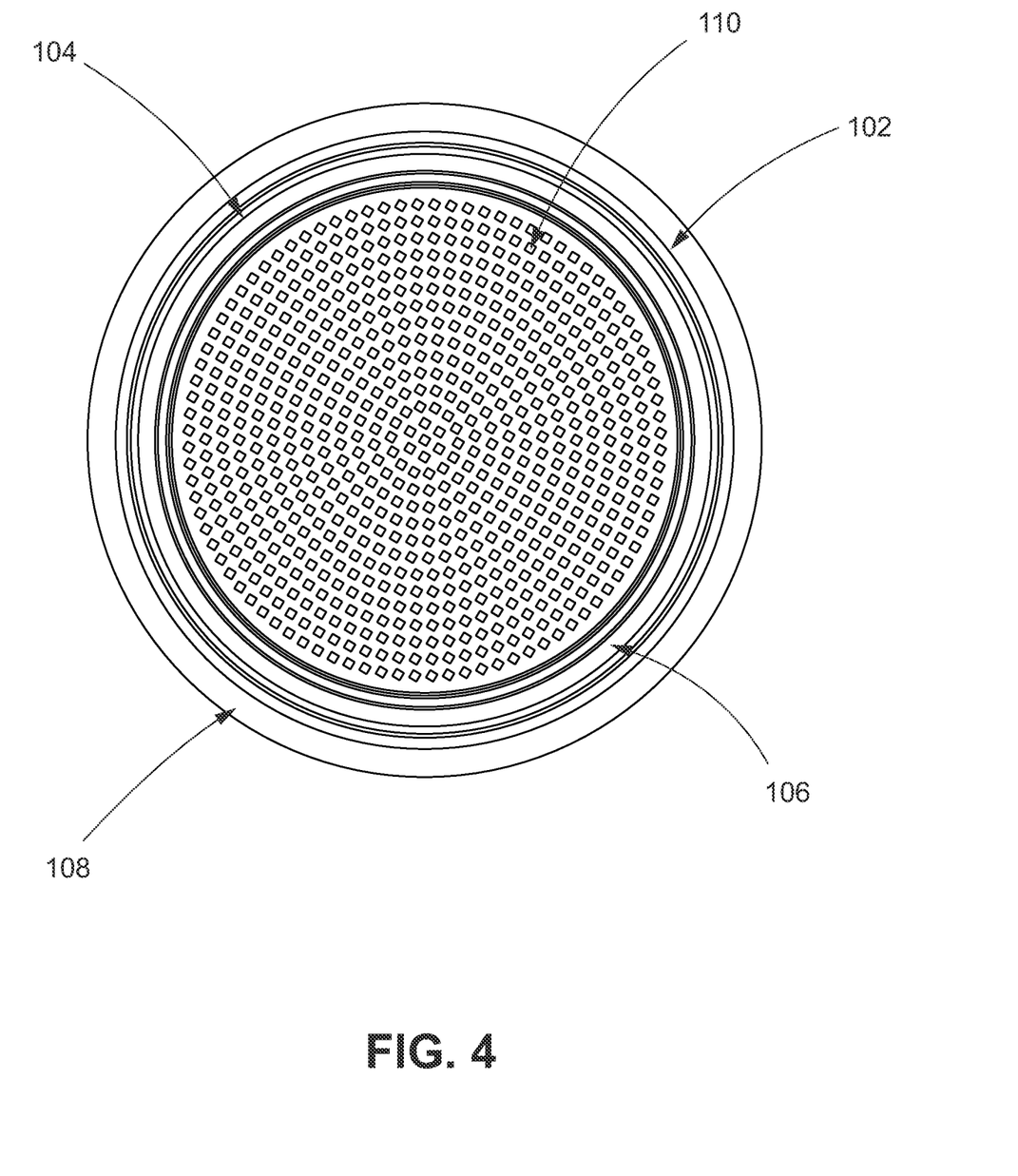
FIG. 4 illustrates a top view of a tray stabilizer system for food delivery robots in accordance with an embodiment of the invention.

FIG. 4 illustrates a top view of a tray stabilizer system for food delivery robots in accordance with an embodiment of the invention. In an embodiment of the invention, the invention includes a base 102, a shock-absorbing outer shell 104, a shock-absorbing inner shell 106, a shock absorbent pad 108, and a suction cup 110. The shock-absorbing outer shell 104 fits concentrically in the inner diameter of the base 102. The shock-absorbing inner shell 104 fits concentrically in the inner diameter of the shock-absorbing outer shell 104. Each component is configured to allow for limited sliding of both the shock-absorbing outer shell 104 and the shock-absorbing inner shell 106 for the purpose of absorbing vertical impact forces.

The invention further includes a method for stabilizing trays utilized by food delivery robots using a tray stabilizer system for food delivery robots, the said tray stabilizer system for food deliver robots comprising a base having an upper end and a lower end; a shock absorbing outer shell assembly, said shock absorbing outer shell assembly having an upper end and a lower end; a shock absorbing inner shell assembly, said shock absorbing inner shell assembly having an upper end and a lower end; a suction cup assembly. The method comprises the steps of: Preparing a surface (a pallet or tray or mounting surface) onto which the tray stabilizer system for food delivery robots is mounted; mounting the suction cup assembly to the prepared surface; placing a tray on the shock absorbing upper pad; and placing an item to be delivered onto the tray.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the tray stabilizer system for food delivery robots, other equivalent or alternative methods of implementing the tray stabilizer system for food delivery robots according to the present invention will be apparent to those skilled in the art. Various aspects of the tray stabilizer system for food delivery robots have been described above by way of illustration, and the specific embodiments disclosed are not intended to limit the invention to the particular forms disclosed. The particular implementation of the tray stabilizer system for food delivery robots may vary depending upon the particular context or application. By way of example, and not limitation, the tray stabilizer system for food delivery robots described in the foregoing was principally directed to food delivery robots. However, similar techniques may instead be applied to other autonomous or semi-autonomous delivery systems which implementations of the present invention are contemplated as within the scope of the present invention. Additionally, differing combinations and arrangements of individual components may be implemented to achieve a more desirable appearance. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of tray stabilizer system for food delivery robots are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively, and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. A tray stabilizer system for food delivery robots comprising:
   a. a base having an upper end and a lower end;
   b. a shock absorbing outer shell assembly, said shock absorbing outer shell assembly having an upper end and a lower end;
   c. a shock absorbing inner shell assembly, said shock absorbing inner shell assembly having an upper end and a lower end;
   d. a suction cup assembly, said suction cup assembly includes a suction cup and a tension spring fixing seat, said suction cup extending from said tension spring fixing seat; and
   e. a shock absorbing upper pad.

2. The tray stabilizer system for food delivery robots of claim 1 wherein a plurality of tension springs connects the tension spring fixing seat of the suction cup assembly to the lower end of the base.

3. The tray stabilizer system for food delivery robots of claim 1 further comprising a ball wheel assembly, the said ball wheel assembly includes a plurality of ball wheels mounted along the inner diameter of the lower end of the base having an upper end and a lower end.

4. The tray stabilizer system for food delivery robots of claim 1 wherein the base having an upper end and a lower end includes a fixing rod mounted in a center of said base having an upper end and a lower end wherein the said fixing rod runs through a center of the shock absorbing outer shell assembly and the center of the shock absorbing inner shell assembly.

5. The tray stabilizer system for food delivery robots of claim 4 wherein a spring surrounds the outer diameter of the fixing rod, and the spring fixing seat is connected to the fixing rod at the upper end of the shock absorbing inner shell assembly.

6. The tray stabilizer system for food delivery robots of claim 1 wherein the shock absorbing inner shell assembly, said shock absorbing inner shell assembly having the upper end and the lower end, includes a shock absorbing inner shell cover which includes a plurality of slide balls which contact the inner diameter of the shock absorbing outer shell and permit the shock absorbing inner shell assembly to travel inwards and outwards from the shock absorbing outer shell.

7. The tray stabilizer system for food delivery robots of claim 1 wherein the shock absorbing inner shell assembly, said shock absorbing inner shell assembly having the upper end and the lower end, includes a slider assembly including at least one downward breather pipe and at least one upward breather pipe.

8. The tray stabilizer system for food delivery robots of claim 6 wherein the slider assembly further includes an upward sealing ring and a downward sealing ring, the said upward sealing ring and the said downward sealing ring serving as a check valve system allowing the shock absorbing inner shell assembly to move vertically while withstanding and absorbing vertical impact forces.

9. The tray stabilizer system for food delivery robots of claim 1 further comprising a return spring, the said return spring positioned between the base having an upper end and a lower end and the shock absorbing inner shell assembly.

10. The tray stabilizer system for food delivery robots of claim 1 wherein the shock absorbing upper pad is made from an impact absorbent material, and is placed on the upper end of the shock absorbing inner shell in such a way so as to create a surface onto which objects are placed.

11. The tray stabilizer system for food delivery robots of claim 1 wherein the surface of the shock absorbing upper pad is grooved in such a manner that, when a downward force is applied to said shock absorbent upper pad, the grooves will increase in surface area providing greater contact with any object placed on the said shock absorbent upper pad.

12. A tray stabilizer system for food delivery robots comprising:
  a. a base having an upper end and a lower end, said base including a fixing rod mounted in the center of said base having an upper end and a lower end;
  b. a shock absorbing outer shell assembly, said shock absorbing outer shell assembly having an upper end and a lower end and configured to slidingly house in the space inside said base having the upper end and the lower end, the center of the said shock absorbing outer shell assembly slides down the fixing rod mounted in the center of said base having an upper end and a lower end;
  c. a shock absorbing inner shell assembly, said shock absorbing inner shell assembly having an upper end and a lower end and configured to slidingly house in the space inside said shock absorbing outer shell assembly having an upper end and a lower end, the center of said shock absorbing inner shell assembly slides down the fixing rod mounted in the center of said base having the upper end and the lower end;
  d. a suction cup assembly, said suction cup assembly consisting of suction cup and a tension spring fixing seat wherein said suction cup assembly is centered and attached to the lower end of said base having an upper end and a lower end,
  e. a ball wheel assembly mounted beneath the base; and
  f. a plurality of tension springs connected between the base and the tension spring fixing seat, said tension spring fixing seat fixed on the said suction cup and mounted under said base.

13. The tray stabilizer system of claim 12 wherein a spring surrounds the outer diameter of the fixing rod, and a spring fixing seat is connected to the fixing rod at the upper end of the shock absorbing inner shell assembly.

14. The tray stabilizer system for food delivery robots of claim 12 wherein the ball wheel assembly is mounted along the inner diameter of the lower end of the base having the upper end and the lower end.

15. The tray stabilizer system for food delivery robots of claim 12 wherein the shock absorbing inner shell assembly, said shock absorbing inner shell assembly having an upper end and a lower end, includes a slider assembly including at least one downward breather pipe and at least one upward breather pipe.

16. The tray stabilizer system for food delivery robots of claim 13 wherein the slider assembly further includes an upward sealing ring and a downward sealing ring, the said upward sealing ring and the said downward sealing ring serving as a check valve system allowing the shock absorbing inner shell assembly to move vertically while withstanding and absorbing vertical impact forces.

17. The tray stabilizer system for food delivery robots of claim 12 further comprising a return spring, the said return spring positioned between the base having the upper end and the lower end and the shock absorbing inner shell assembly.

18. The tray stabilizer system for food delivery robots of claim 12 wherein the shock absorbing upper pad is made from an impact absorbent material, and is placed on the upper end of the shock absorbing inner shell in such a way so as to create a surface onto which objects are placed, said surface is grooved in such a manner that, when a downward force is applied to said shock absorbent upper pad, the grooves will increase in surface area providing greater contact with any object placed on said shock absorbent upper pad.

19. A method for stabilizing trays utilized by food delivery robots using a tray stabilizer system for food delivery robots, said tray stabilizer system for food deliver robots comprising a base having an upper end and a lower end; a shock absorbing outer shell assembly, said shock absorbing outer shell assembly having an upper end and a lower end; a shock absorbing inner shell assembly, said shock absorbing inner shell assembly having an upper end and a lower end; a suction cup assembly; and a shock absorbing upper pad, the method comprising the steps of:
  a. preparing a surface onto which the tray stabilizer system for food delivery robots is mounted;
  b. mounting the suction cup assembly to the prepared surface;
  c. placing a tray on the shock absorbing upper pad; and
  d. placing an item to be delivered onto the tray.

\* \* \* \* \*